United States Patent
Estrada et al.

(10) Patent No.: US 10,704,691 B2
(45) Date of Patent: Jul. 7, 2020

(54) MECHANICAL SEAL BETWEEN AN ACTUATOR HOUSING AND COVER AND METHOD FOR PROVIDING A SEAL BETWEEN AN ACTUATOR HOUSING AND COVER

(71) Applicants: Eduardo Estrada, Cd. Juarez (MX); John Fan, Shanghai (CN)

(72) Inventors: Eduardo Estrada, Cd. Juarez (MX); John Fan, Shanghai (CN)

(73) Assignee: INTEVA PRODUCTS, LLC, Troy, MI (US)

( * ) Notice: Subject to any disclaimer, the term of this patent is extended or adjusted under 35 U.S.C. 154(b) by 379 days.

(21) Appl. No.: 14/923,149

(22) Filed: Oct. 26, 2015

(65) Prior Publication Data
US 2016/0115980 A1 Apr. 28, 2016

(30) Foreign Application Priority Data
Oct. 27, 2014 (CN) .......................... 2014 1 0584901

(51) Int. Cl.
*F16J 15/04* (2006.01)
*E05B 85/02* (2014.01)
(Continued)

(52) U.S. Cl.
CPC .............. *F16J 15/04* (2013.01); *E05B 77/34* (2013.01); *E05B 81/25* (2013.01); *E05B 85/02* (2013.01)

(58) Field of Classification Search
CPC ... F16J 15/00; F16J 15/02; F16J 15/04; E05B 77/34; B65D 45/22; B65D 45/16; B65D 45/20
See application file for complete search history.

(56) References Cited

U.S. PATENT DOCUMENTS 1,547,210 A * 7/1925 Garrett ................. B61D 19/001
                                                  292/201
4,368,819 A * 1/1983 Durham ............. B65D 81/3823
                                                  206/544
(Continued)

FOREIGN PATENT DOCUMENTS

CN       101424774 A       5/2009
CN       101426690 A       5/2009
(Continued)

OTHER PUBLICATIONS

"Synthetic Rubber—Bet You didn't Know it was a Plastic!", viewed on Jun. 4, 2018, http://www.plasticsindustry.com/synthetic-rubber.asp (Year: 2018).*

(Continued)

*Primary Examiner* — Alyson M Merlino
(74) *Attorney, Agent, or Firm* — Cantor Colburn LLP

(57) ABSTRACT

A method and apparatus for providing a mechanical seal between two objects is provided. The mechanical interface including a protrusion located on a first component; and a pair of cantilevered beams located on a second component, wherein the pair of cantilevered beams are forced outwardly on opposite sides of the protrusion when a tab portion of the second component is received in an opening of the first component. The method of including the steps of: forcing a pair of cantilevered beams located on a second component outwardly from opposite sides of the protrusion when as a tab portion of the second component is received in an opening of a first component.

15 Claims, 4 Drawing Sheets

(51) Int. Cl.
 *E05B 81/24* (2014.01)
 *E05B 77/34* (2014.01)

(56) References Cited

U.S. PATENT DOCUMENTS

| | | | | |
|---|---|---|---|---|
| 5,125,702 | A * | 6/1992 | Fukumoto | E05B 77/34 277/642 |
| 5,531,345 | A * | 7/1996 | Nakamura | H02G 3/088 220/3.8 |
| 6,186,152 | B1 * | 2/2001 | Gueret | A45C 13/008 220/849 |
| 6,293,286 | B1 * | 9/2001 | Gueret | A45C 13/008 220/849 |
| 6,676,130 | B2 * | 1/2004 | Schmitt | F16J 15/164 277/349 |
| 7,063,212 | B2 * | 6/2006 | Ordonez | B65D 77/02 220/849 |
| 7,261,335 | B2 * | 8/2007 | Schupp | E05B 77/02 292/201 |
| 7,414,190 | B2 * | 8/2008 | Vo | H05K 5/063 174/50 |
| 8,796,548 | B2 * | 8/2014 | Rost | H05K 5/061 174/50 |
| 2012/0242095 | A1 * | 9/2012 | Niwa | E05L 381/18 292/142 |
| 2013/0319716 | A1 | 12/2013 | Rost et al. | |
| 2015/0239631 | A1 * | 8/2015 | Kinskey | B65D 45/20 220/4.22 |

FOREIGN PATENT DOCUMENTS

| | | | |
|---|---|---|---|
| CN | 201890429 U | 7/2011 | |
| EP | 2750985 | 7/2014 | |
| FR | 2998604 A1 * | 5/2014 | E05B 85/02 |
| WO | 2009072148 A1 | 6/2009 | |
| WO | 2012108523 A1 | 8/2012 | |

OTHER PUBLICATIONS

CN Office Action for Application No. 201410584901.X; dated Jul. 6, 2018.
CN Office Action for Application No. 201410584901.X; dated Oct. 23, 2017.
CN Search Report for Application No. 201410584901.X; dated Jul. 6, 2018.
CN Search Report for Application No. 201410584901.X; dated Oct. 23, 2017.
English Translation to CN Office Action for Application No. 201410584901.X; dated Jul. 6, 2018.
English Translation to CN Office Action for Application No. 201410584901.X; dated Oct. 23, 2017.

* cited by examiner

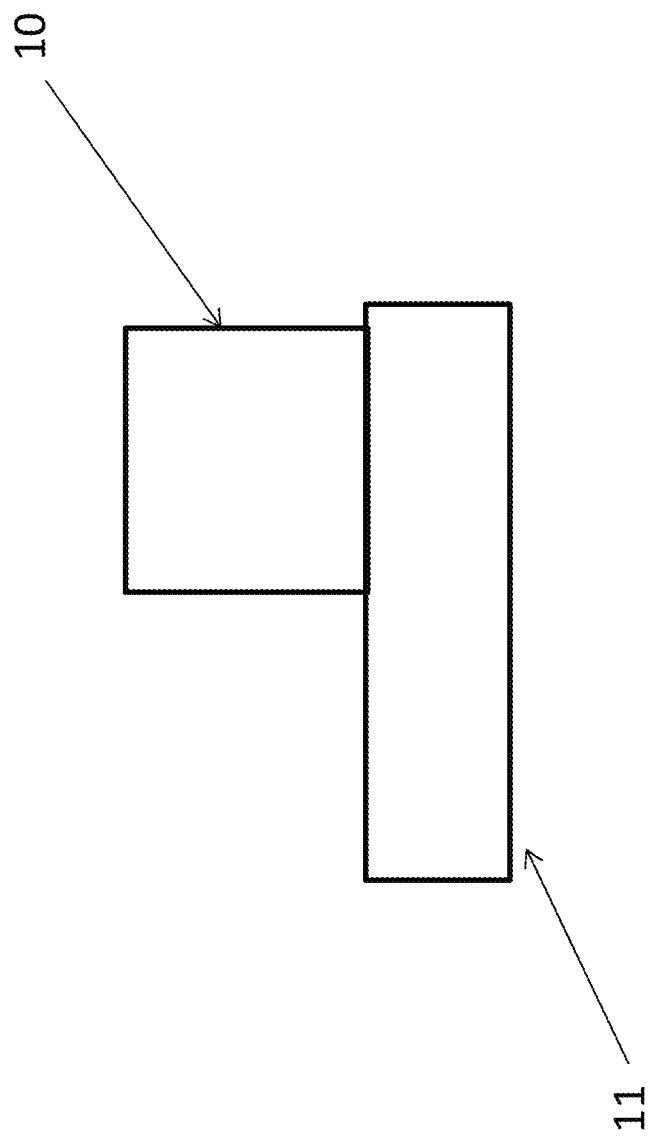

MECHANICAL SEAL BETWEEN AN ACTUATOR HOUSING AND COVER AND METHOD FOR PROVIDING A SEAL BETWEEN AN ACTUATOR HOUSING AND COVER

BACKGROUND

This application claims priority under 35 U.S.C. § 119 to the following Chinese Patent application no. CN 201410584901.X, filed Oct. 27, 2014, the entire contents of which are incorporated herein by reference thereto.

Various embodiments of the present invention relate to an actuator for a vehicle latch and more particularly, a mechanical seal between a housing and a cover of the actuator and a method for providing a seal between a housing and a cover of the actuator.

In some applications, latches are required to perform numerous operations within limited confines of an application area of the item they are installed in. Still further, some latches include motorized actuators for performing some of these operations.

An actuator may have a housing with a cover configured to be secured to the housing. Due to the environments the actuator is located in it is desirable to have a good seal between the cover and the housing of the actuator. In order to protect the internal components of the actuator from moisture and/or debris. While an actuator is mentioned above it is also understood that it is also desirable to provide a good seal between a cover and a housing of a latch for a vehicle latch, that may or may not have an actuator secured thereto.

One method for providing a seal between the cover and the housing of an actuator is to locate an elastomer in between edges of the cover and the housing that are adjacent to each other when the cover is secured to the housing. However and in order to provide a suitable seal, a compressible elastomer must be used in order to provide a separation force between the cover and the housing. In addition the elastomer must also be capable of deforming such that it fills the gaps in between the two components (e.g., cover and housing) due to imperfections in the mating of the components.

An alternative method of sealing a plastic cover to a plastic housing is achieved through a welding process such as ultrasonic welding or laser welding. However, the ultrasonic welding process requires an extra component or portion for use as the staking in the welding process, which can be pre-molded or extruded in place. The laser welding process on the other hand, requires the use of expensive equipment, which may also be labor-intensive.

Accordingly, it is desirable to provide an improved seal between the housing and the cover of an actuator or latch for a vehicle latch.

SUMMARY OF THE INVENTION

In one embodiment, a mechanical interface for securing two objects together is provided. The mechanical interface comprising: a protrusion located on a first component; a pair of cantilevered beams located on a second component, wherein the pair of cantilevered beams are forced outwardly on opposite sides of the protrusion when a tab portion of the second component is received in an opening of the first component.

In another embodiment, an assembly is provided. The assembly, having: a first component having a protrusion, the protrusion extending about a periphery of the first component; a second component having a pair of cantilevered beams, the pair of cantilevered beams extending about a periphery of the second component each of the cantilevered beams being configured for interaction with the protrusion of the first component when the second component is secured to the first component, wherein each pair of cantilevered beams are forced outwardly on opposite sides of the protrusion when each one of a plurality of tab portions of the second component are is received in a respective opening of a plurality of openings of the first component.

In yet another embodiment, a method of providing a mechanical interface between two objects is provided. The method including the steps of: forcing a pair of cantilevered beams located on a second component outwardly from opposite sides of the protrusion when as a tab portion of the second component is received in an opening of a first component.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein:

FIG. 4 is a schematic illustration of an actuator secured to a latch.

Figure 1:
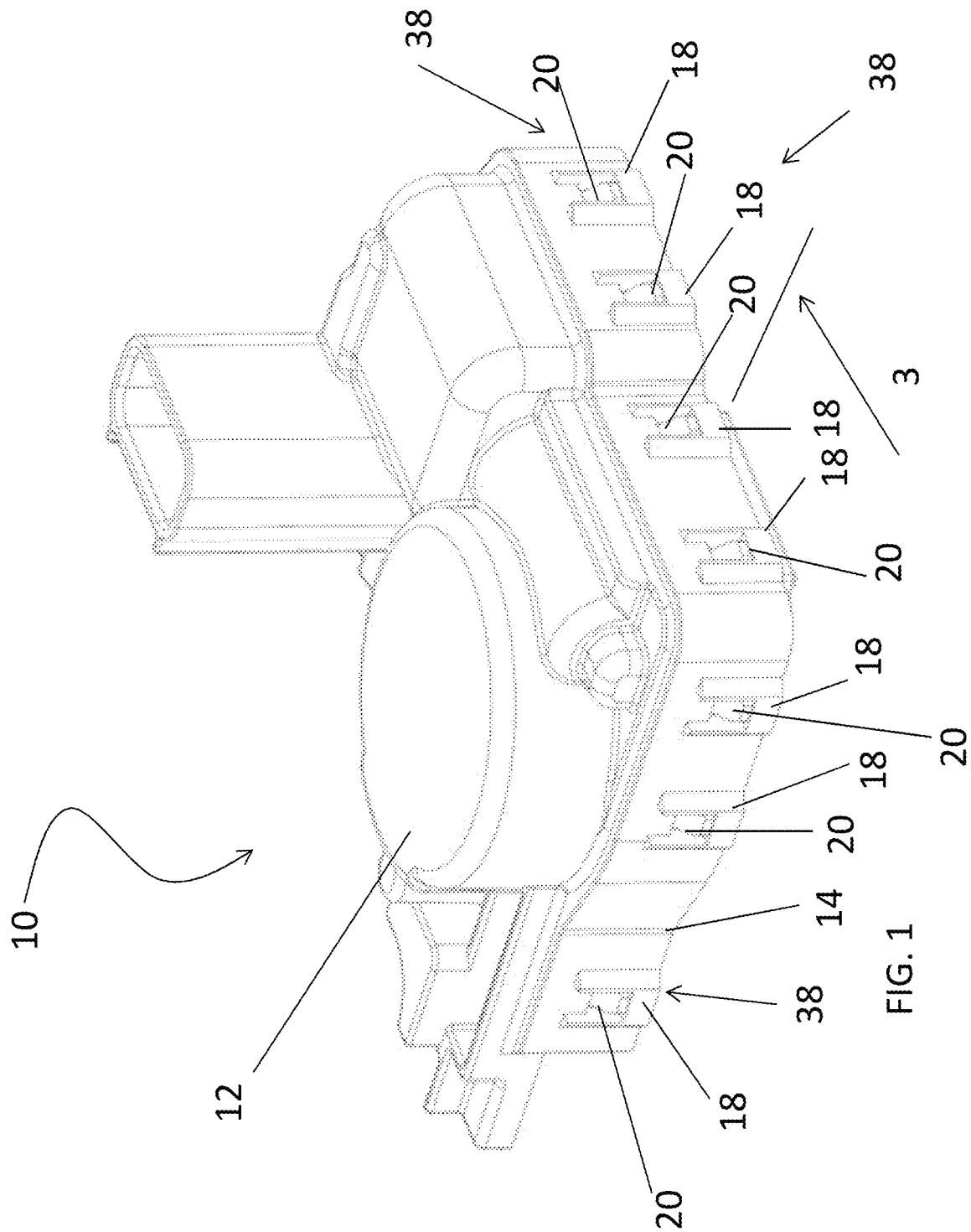
FIG. 1 is a perspective view of an actuator in accordance with an embodiment of the invention.
Figure 2:
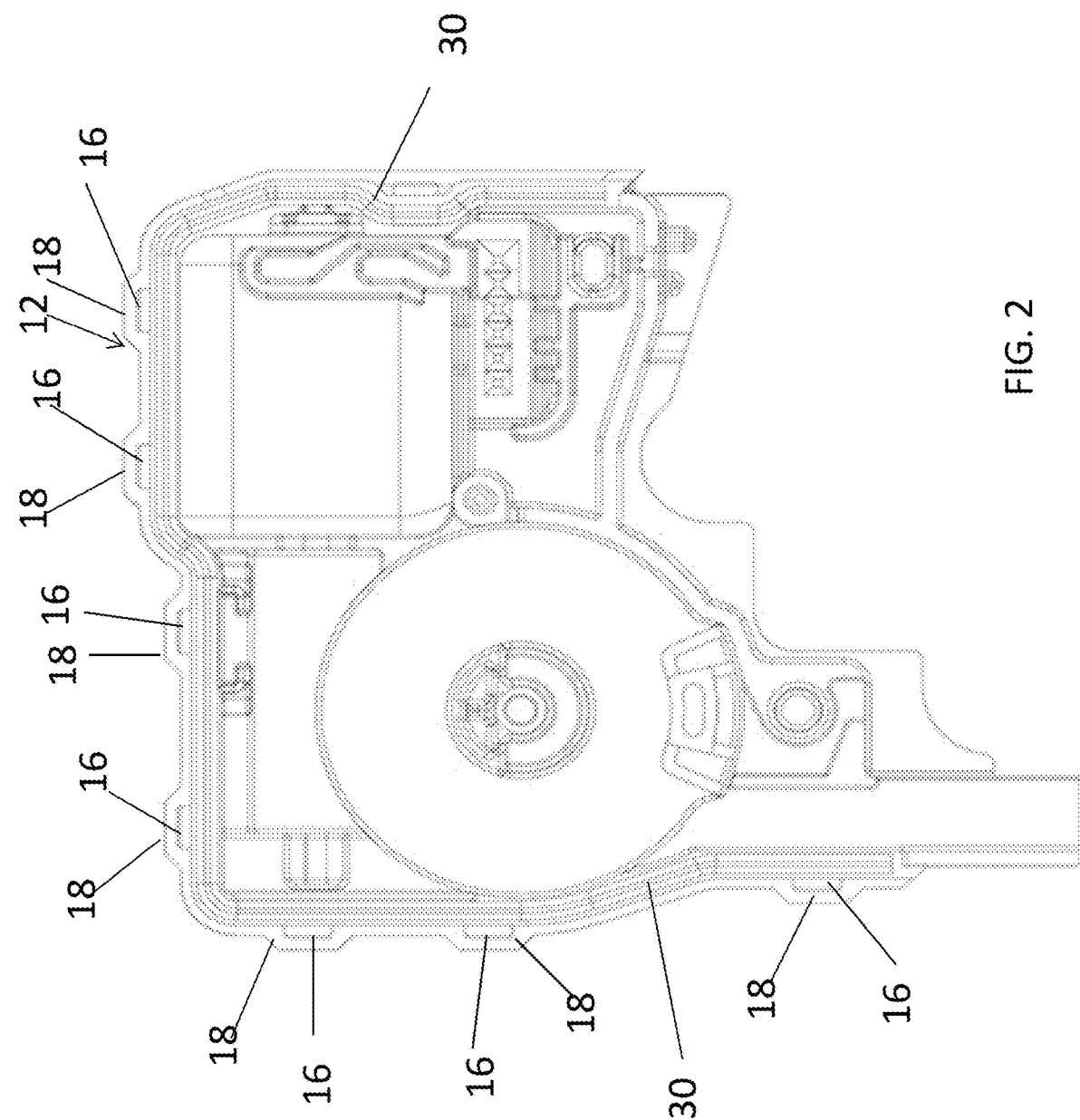
FIG. 2 is a bottom view of the actuator housing in accordance with an embodiment of the invention.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Referring now to the FIGS., an actuator 10 is illustrated. In one embodiment, the actuator 10 is configured for use in or with a latch or vehicle latch 11, wherein a motor of the actuator drives a worm and the worm is operatively coupled to a gear, which when driven drives components of the vehicle latch the gear is also operatively coupled to. In one embodiment, the actuator 10 has a housing or housing portion or first component 12 and a cover or cover portion or second component 14. In one embodiment the housing 12 and cover 14 may be made out of plastic such as polypropylene in order to provide a seal between the housing 12 and the cover 14.

Figures 3, 3A:
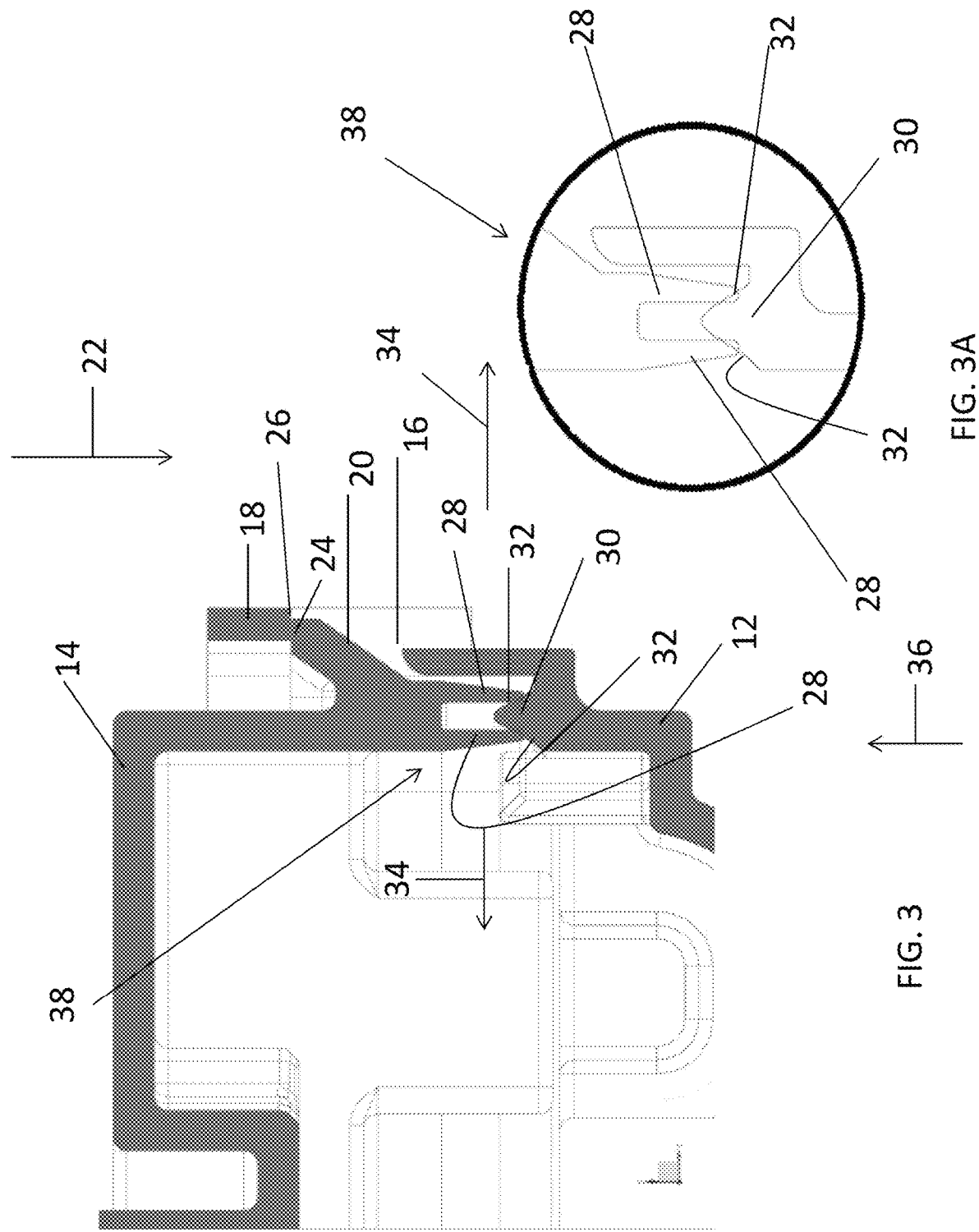
FIG. 3 is a cross sectional view of a portion of the actuator in FIG. 1 along line 3.
FIG. 3A is a view of the mechanical seal between the actuator housing and cover in accordance with an embodiment of the present invention.

In the illustrated embodiment, the housing 12 has a plurality of openings 16 each of which has a complementary ledge portion or feature 18 located proximate to the opening 16 for engagement with a tab portion 20 of the cover 14. Tab portion 20 is configured such that when cover 14 is secured to housing 12 (e.g., the cover 14 moves in the direction of arrow 22 in FIG. 3 with respect to housing 12) the tab portion 20 passes by ledge portion or feature 18 internally until an end 24 of tab portion 20 contacts an end 26 of ledge portion or feature 18 such that tab portion 20 is now retained within an opening 16.

At the same time a pair of cantilevered beams 28 of the cover 14 engage a protrusion 30 of the housing 12 in order to provide a seal between the two components 12 and 14. As discussed, above it is desirable to provide such as seal in order to protect the internal components of the actuator from moisture and/or debris. Protrusion 30 is configured to have a triangular or conical shape such that sloped surfaces 32 of protrusion 30 contact cantilevered beams 28 as the cover 14 moves in the direction of arrow 22 with respect to housing 12. This interaction (e.g., cantilever beams 28 contacting protrusion 30) causes the cantilevered beams 28 to move outwardly from protrusion 30 in the direction of arrows 34 such that a good seal between cover 14 and housing 12 is provided. The seal being formed mechanically from the components of the actuator (e.g., housing 12 and cover 14) such that no additional components (e.g., elastomeric member) are required for a seal. It being understood that the material (e.g., plastic or other equivalent material) used for cover 14 and thus cantilevered beams 28 has resilient characteristics (e.g., capable of being deflected from an original state and then springing back towards its original state) such that the cantilevered beams 28 can move or be deflected outwardly from protrusion 30 in the direction of arrows 34 as the beams 28 contact protrusion 30 and once the cover 14 is secured to the housing 12 (e.g., tab portions 20 engage features 18) the resilient characteristics of the cantilevered beams 28 apply a force in a direction opposite to arrows 34 to protrusion 30 which in turn causes the reactionary force upward in the direction of arrow 36 to be generated and thus create a tight seal as ends 24 of tab portions 20 contact the surfaces 26 of features 18 and beams 28 contact protrusion 30.

In addition and in one embodiment, the two cantilevered beams 28 of the cover 14 extend completely around a periphery of the cover 14 for interaction with a corresponding protrusion 30 that extends completely around a periphery of the housing 12 such that a seal is formed by the beams 28 and protrusion 30 each of which extends completely around the perimeter or the interface of the two parts to provide a seal. Alternatively and in another embodiment, the two cantilevered beams 28 and the protrusion 30 may only extend around a portion of the periphery of the housing 12 and the cover 14 in order to provide the mechanical seal in localized areas of the housing 12 and cover 14 of the actuator 10. Still further and in yet another alternative embodiment, the two cantilevered beams 28 and the protrusion 30 may only extend around separate portions of the periphery of the housing 12 and the cover 14 in order to provide mechanical seals (e.g., more than one) in localized areas of the actuator.

In other words, and as the cover 14 is secured to housing 12, the cantilevered beams 28 first contact protrusion 30 prior to tab portion 20 being fully seated in opening 16 (e.g., end or end portion 24 of tab portion 20 contacting end or end portion 26 of ledge or feature 18) such that the cantilevered beams 28 must be deflected outwardly in the direction of arrows 34 prior to tab portion 20 being fully received within opening 16 and engaging ledge or feature 18.

In addition, the interaction of protrusion 30 with cantilevered beams 28 also creates a reactionary force in the direction of arrow 36 to keep tab or tab portion 20 engaged with ledge or feature 18 of opening 16.

Another added benefit of the use of cantilevered beams 28 is that a greater amount of surface area is provided (e.g., cantilever beams contacting opposite sides of protrusion 30) which increases the contact area and aids in the sealing function.

As such, a mechanical seal between the actuator housing and cover is provided using only the material of the mating components, in this case the housing 12 and the cover 14, which as described above may be made out of plastic material such as polypropylene in order to seal the assembly. Although a specific example of an actuator assembly (e.g., housing and cover) is illustrated, it is understood that various embodiments of the present invention may be applicable to any type of assembly wherein a housing is configured to have a cover secured thereto with a mechanical interface such as the one described and disclosed herein wherein a mechanical seal is provided between the materials of the mating components.

As described herein one exemplary embodiment of the present invention consists of creating two cantilever beams 28 that deform when the cover 14 is assembled with the housing 12. The housing 12 has a triangular shape 30 that pushes the two cantilever beams 28 away from each other. This deformation creates a natural reaction force between the triangular shape 30 and the cantilever beams 28 and this force provides the same function as the elastomer deformation. In addition, the triangular shape 30 also increases the contact area and aids in the sealing function.

In addition, it is also understood that a plurality of contact areas comprising, pairs of cantilevered beams 28 and protrusion 30, are located around the interfacing surfaces of the cover 14 and the housing 12. In other words, a plurality of interfaces 38 are provided to secure the cover 14 to the housing 12, wherein the interfaces 38 comprise at least a pair of cantilevered beams 28 and a protrusion 30 as well as a tab portion 20 and ledge or feature 18 proximate to opening 16.

Various embodiments of the present invention provide cost savings to existing means for sealing and securing two components together as the number of components required to seal the cover to the housing of the actuator are eliminated. For example, the elastomeric seal is now no longer required since it is replaced with the interfaces 38 which include cantilevered beams 28 and protrusion 30. Accordingly, an actuator with such a mechanical seal provides a competitive and cost efficient design.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mechanical interface that secures a first component and a second component together, the mechanical interface comprising:
    a protrusion located on the first component;
    a pair of cantilevered beams formed as a single piece with the second component, the pair of cantilevered beams each having an interior surface and an opposite exterior surface, the interior surface of each of the pair of cantilevered beams being in a facing spaced relationship with respect to each other to define a channel that receives the protrusion when the second component is secured to the first component, wherein the opposite exterior surface of each of the pair of cantilevered beams slopes inwardly towards the channel, and each of the pair of cantilevered beams has a distal end where the interior surface and the opposite exterior surface of each of the pair of cantilevered beams terminate, each distal end contacting a corresponding angled surface of the protrusion when the first component is secured to the second component, wherein each of the pair of cantilevered beams must be forced outwardly away from each other on opposite sides of the protrusion prior to a tab portion of the second component being fully received and engaged into an opening of the first component during a process of securing the first component to the second component, and wherein the first component is a housing of an actuator of a vehicle latch and the second component is a cover.

2. The interface as in claim 1, wherein the pair of cantilevered beams and the housing and the cover are formed from plastic.

3. The interface as in claim 2, wherein the housing provides a reaction force towards the cover when the cover is secured to the housing.

4. The interface as in claim 1, wherein the housing provides a reaction force towards the cover when the cover is secured to the housing.

5. The interface as in claim 1, wherein the protrusion is triangular in shape.

6. The interface as in claim 5, wherein the housing provides a reaction force towards the cover when the cover is secured to the housing.

7. An assembly, comprising:
    a first component having a protrusion, the protrusion extending about a periphery of the first component;
    a second component having a pair of cantilevered beams formed as a single piece with the second component, the pair of cantilevered beams extending about a periphery of the second component, each of the cantilevered beams being configured for interaction with the protrusion of the first component when the second component is secured to the first component, the pair of cantilevered beams each having an interior surface and an opposite exterior surface, the interior surface of each of the pair of cantilevered beams being in a facing spaced relationship with respect to each other to define a channel that receives the protrusion when the second component is secured to the first component, wherein the opposite exterior surface of each of the pair of cantilevered beams slopes inwardly towards the channel, and each of the pair of cantilevered beams has a distal end where the interior surface and the opposite exterior surface of each of the pair of cantilevered beams terminate, each distal end contacting a corresponding angled surface of the protrusion when the first component is secured to the second component, wherein each of the pair of cantilevered beams must be forced outwardly away from each other on opposite sides of the protrusion prior to each of a plurality of tab portions of the second component being fully received and engaged into a respective opening of a plurality of openings of the first component during a process of securing the first component to the second component, and wherein the assembly is an actuator of a vehicle latch and the first component is a housing of the actuator and the second component is a cover.

8. The assembly as in claim 7, wherein the housing and the cover are formed from plastic.

9. The assembly as in claim 7, wherein the housing has a plurality of features located proximate to the plurality of openings, each feature configured for engagement with an end of a corresponding one of the tab portions when the tab portions are fully received within the openings.

10. The assembly as in claim 9, wherein the housing provides a reaction force towards the cover when the cover is secured to the housing.

11. The assembly as in claim 7, wherein the protrusion is configured to have a triangular shape such that sloped surfaces of the protrusion contact the interior surfaces of the pair of cantilevered beams as the cover is secured to the housing.

12. The assembly as in claim 7, wherein the housing provides a reaction force towards the cover when the cover is secured to the housing.

13. A method of providing a mechanical interface between a first component and a second component, comprising:
    forcing a pair of cantilevered beams, located on the second component, outwardly from each other on opposite sides of a protrusion of the first component prior to a tab portion of the second component being fully received and engaged into an opening of the first component to secure the second component to the first component, the pair of cantilevered beams formed as a single piece with the second component and the pair of cantilevered beams extend about a periphery of the second component, each of the cantilevered beams being configured for interaction with the protrusion of the first component when the second component is secured to the first component, each of the pair of cantilevered beams having an interior surface and an opposite exterior surface, the interior surface of each of the pair of cantilevered beams being in a facing spaced relationship with respect to each other to define a channel that receives the protrusion when the second component is secured to the first component, wherein the opposite exterior surface of each of the pair of cantilevered beams slopes inwardly towards the channel, and each of the pair of cantilevered beams has a distal end where the interior surface and the opposite exterior surface of each of the pair of cantilevered beams terminate, each distal end contacting a corresponding angled surface of the protrusion when the first component is secured to the second component, and wherein the first component is a housing of an actuator and the second component is a cover.

14. The method as in claim 13, wherein the protrusion is triangular in shape.

15. The method as in claim 13, wherein the pair of cantilevered beams and the housing and the cover are formed from plastic.

\* \* \* \* \*